United States Patent [19]
Hoffschmidt et al.

[11] Patent Number: 5,944,010
[45] Date of Patent: Aug. 31, 1999

[54] SHUTTER MEANS FOR REGULATING THE FLUID FLOW IN AN ABSORBER PIPE OF A SOLARTHERMAL POWER PLANT

[75] Inventors: Bernhard Hoffschmidt, Bergisch Gladbach; Robert Pitz-Paal, Troisdorf; Peter Rietbrock, Cologne; Manfred Boehmer, Lohmar, all of Germany

[73] Assignee: Deutsches Zentrum fuer Luft- und Raumfahrt e.V., Bonn, Germany

[21] Appl. No.: 09/133,849

[22] Filed: Aug. 13, 1998

[30] Foreign Application Priority Data

Aug. 21, 1997 [DE] Germany .......................... 197 36 335

[51] Int. Cl.⁶ ....................................................... F24J 2/40
[52] U.S. Cl. ............................................. 126/585; 126/680
[58] Field of Search ..................................... 126/585, 680, 126/701, 599, 583, 648, 652, 655, 657

[56] References Cited

U.S. PATENT DOCUMENTS

| 4,237,865 | 12/1980 | Lorenz | 126/599 |
|---|---|---|---|
| 4,273,102 | 6/1981 | Anthony | 126/585 |
| 4,777,935 | 10/1988 | Fricker | 126/585 |

FOREIGN PATENT DOCUMENTS 4418951  5/1994  Germany .

*Primary Examiner*—James C. Yeung
*Attorney, Agent, or Firm*—Diller, Ramik & Wight, PC

[57] ABSTRACT

A shutter (1; 10) for regulating the fluid flow in an absorber pipe (D) of a solar-thermal power plant comprises a shutter body (2) with a central shutter opening (3) for the fluid (F) and a movable throttle element (4; 12) at least partly closing the shutter opening (3; 11). The throttle element (4) is connected to a motion element (6) that is in thermal contact with the fluid (F) and changes its shape as a function of the fluid temperature so that in case of an increased temperature of the fluid (F), the opening cross section of the shutter opening (3; 11) is enlarged, whereby the mass flow of the fluid (F) increases and the temperature thereof drops.

8 Claims, 2 Drawing Sheets

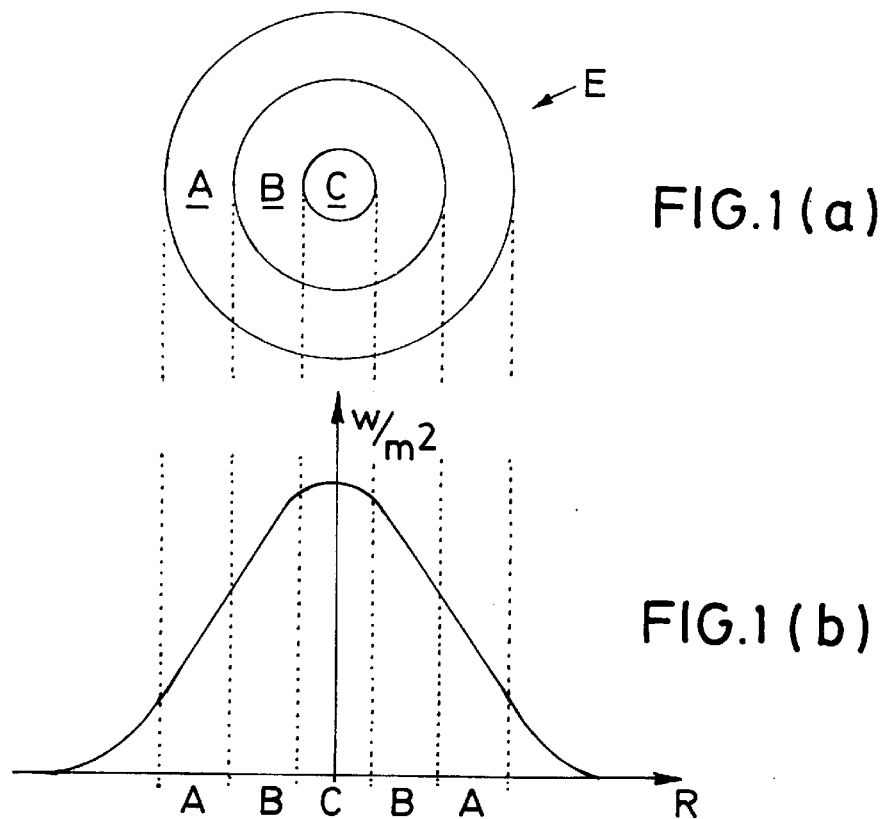
FIG.1(a)
FIG.1(b)
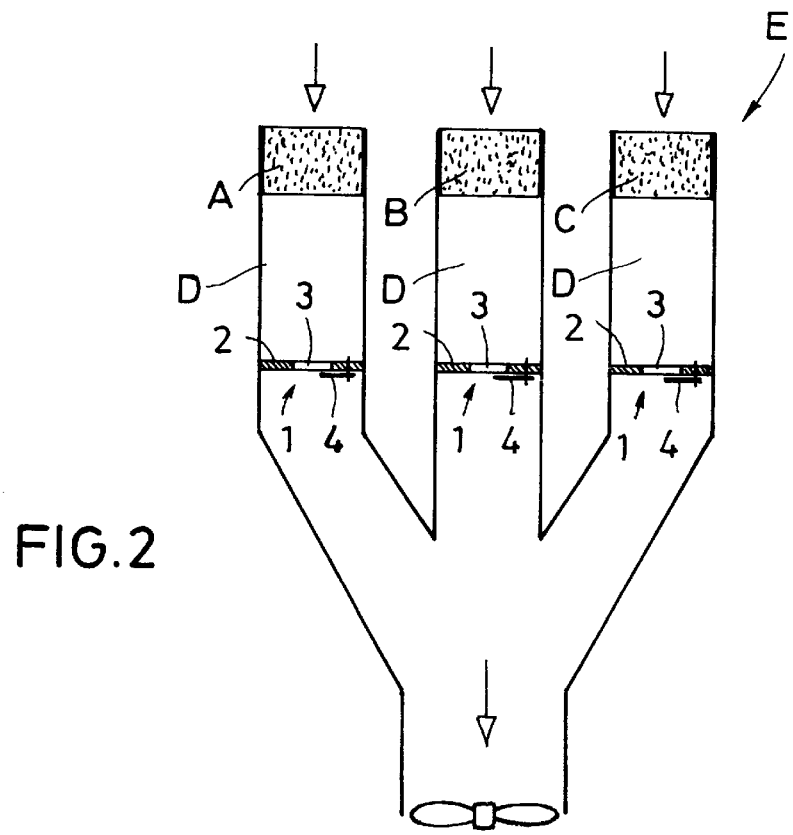
FIG.2

(1) 5,944,010

SHUTTER MEANS FOR REGULATING THE FLUID FLOW IN AN ABSORBER PIPE OF A SOLARTHERMAL POWER PLANT

BACKGROUND OF THE INVENTION

The present invention refers to a shutter for regulating the fluid flow in an absorber pipe of a solar-thermal power plant, in particular a power plant with a plurality of absorber pipes.

In a solar-thermal power plant, the energy source is solar radiation concentrated by optical installations such as heliostats or parabolic grooves. In contrast to the energy sources of conventional steam generators, solar radiation cannot be controlled, but is susceptible to a continuous change due to the diurnal and seasonal course of the sun. Here, the intensity of the impinging radiation, as well as the distribution of the radiation on the absorber change.

In a receiver, comprising, e.g., a plurality of absorber pipes with volumetric absorbers installed therein, the concentrated solar radiation is absorbed and transferred to a heat transfer medium, e.g., a fluid such as air. For technical exploitation of the energy in the heat transfer medium, it is required, in particular with volumetric receivers that the outlet temperature of the fluid should be as constant as possible across the cross-section of the receiver. To this end, the mass flow distribution of the heat transfer medium has to be adjusted over the receiver surface so as to correspond to the distribution of the intensity of the impinging radiation.

Typically, the mass flow distribution of the fluid is realized in the receiver by means of fixed shutters. Due to the high temperatures that can exceed 1000° C., and also for cost reasons, these shutters cannot be controlled actively, which results in the fact that a homogenous outlet temperature can generally be reached for a single optimum operation point, only. The optimum operation point of the mass flow distribution is usually selected such that an energetic maximum, averaged over a year, is reached with respect to the optimum operation. Thus, the optimum operation is based on an average radiation distribution. Deviations of the real distribution of the impinging radiation, as occur in operation, from the average distribution can easily cause local overheating of receiver parts. In practice, the impinging radiation on the receiver is reduced in such cases, resulting in the plant not being able to use the maximum of the available concentrated solar radiation.

German Patent 44 18 951 discloses a solar energy plant with an absorber structure flown through by air, the structure being connected to a heat consuming device through a flow channel. A temperature sensor disposed on the flow channel is connected to a temperature controller controlling a fan and a throttle valve. The fan and the throttle valve connected in series therewith, adjust the air flow to the changed conditions of impinging radiation. The fan is used to regulate higher air flows, while the throttle valve is used to regulate lower air flows that cannot be adjusted by means of the variable fan. This controller is complicated and uses up a part of the energy produced by the solar energy plant, thus reducing its efficiency.

SUMMARY OF THE INVENTION

It is an object of the present invention to improve the receiver of a solar-thermal power plant such that the exploitation of the changing incident concentrated radiation is improved.

Briefly, the present invention relates to a shutter for regulating the fluid flow in an absorber pipe of a solar-thermal power plant and to a solar receiver.

The shutter of the present invention may be installed in an absorber pipe or set upon a front end face of an absorber pipe. It has at least one shutter opening for the fluid flowing through the absorber pipe and at least one movable throttle element at least partly closing the or one shutter opening. The throttle element is connected to a motion element in thermal contact with the fluid and changing shape depending on the fluid temperature. A hot fluid flow passes through the shutter, the temperature of the fluid flow depending on the mass flow of the fluids. With the mass flow increasing, i.e. with the shutter open, the fluid temperature drops, since more fluid takes up the absorbed energy of the incident radiation during the same span of time. Without any control acting from outside, the self-regulating shutter adjusts the local mass flow of the fluid to the present distribution of incident radiation such that a predetermined fluid temperature corresponding to the optimum operation point of the shutter is obtained. Should the shutter be installed in each absorber pipe of the receiver, the mass flow, and thus, the temperature of the individual regions of the receiver can be controlled individually. Hereby, the efficiency of the receiver, and thereby of the power plant, is increased and the service life of the installation is prolonged by reducing local excess temperatures.

The simple structure of the present shutter having merely one motion element and a throttle element offers a solution that is economic to realize and, moreover, is very heat resistant and failsafe.

BRIEF DESCRIPTION OF THE DRAWINGS

The following is a detailed description of the present invention with reference to the accompanying drawings.

In the Figures:

FIG. 1a is a top plan view, and illustrates the front end face of the receiver of the invention FIG. 1b is an exemplary distribution of the radiation intensity impinging on the receiver of FIG. 1a.

FIG. 2 illustrates a schematic representation of the structure of a solar-thermal receiver with a plurality of absorber pipes and with shutters of the present invention installed therein.

DESCRIPTION OF PREFERRED EMBODIMENTS

In a solar-thermal power plant, the incident radiation is focused onto the front end face of a receiver E (FIG. 1a). Typically, the front end face has an area of several square meters and comprises a plurality of individual absorber elements each connected to an absorber pipe for transferring the heated fluid.

Further, FIG. 1b represents the incident radiation intensity on the receiver E; it is given in $W/m^2$ over the radius R of the receiver E. The incident radiation intensity has the shape of a Gaussian distribution, changing as a function of the season, the daily course of the sun and interferences with the radiation path, e.g., clouds. In correspondence to these Gaussian curves, the front end face of the receiver E is subdivided into a plurality of absorber regions, in the present case, for example, the regions A, B, and C. The different absorber regions are distributed such that focused solar radiation intensities of different values impinge on these regions, whereby, upon leaving the absorber pipe, the fluid media led through the different absorber regions have different temperature values, though they have the same mass flow. The fluid media of the different absorber regions are then combined with the fluid medium attaining a desired mean temperature.

FIG. 2 is a schematic cross-sectional view of the receiver E. Representative of the three absorber regions A, B, and C, a volumetric absorber is shown, respectively. For example, such an absorber is made from a porous ceramics material such as silicon carbide, heated by the focused solar radiation. Then, air is drawn through the absorber, whereby the absorber transfers the heat to the air by convection. On may also use directly absorbing absorbers through which a dark liquid circulates that is heated up directly by the concentrated solar radiation.

Here, the absorbers A, B, C are each placed on or in respective absorber pipes D that converge into one pipe that is connected to a suction device such as a fan blower. Each absorber pipe D holds a shutter 1 of the present invention allowing to individually control each absorber portion having a different temperature. First, the structure of the shutter 1 will be explained hereunder with reference to FIGS. 3 and 4.

Figure 3:
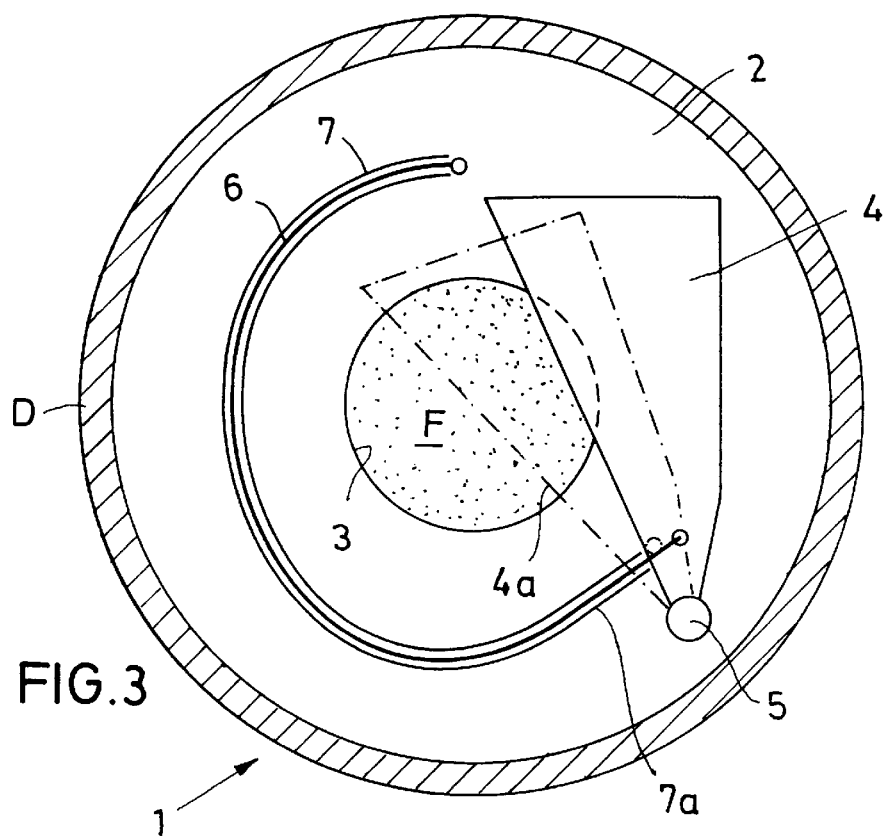
FIG. 3 is a front view of a first embodiment of the shutter.

FIG. 3 illustrates a first embodiment of a present shutter 1 inserted flush into the absorber pipe D so that the cross-section of the absorber pipe D is reduced in a defined manner. The shutter 1 has a shutter body 2 with a central shutter opening 3 for the fluid F. The shutter opening 3 may be closed at least partly by means of a throttle element 4, e.g. in the form of a pivotal flap. The throttle element 4 is fastened to the shutter body 2 through a hinge 5 and may be pivoted in the plane of the shutter body 2.

A string shaped flexible motion element 6 has one end fastened to the shutter body 2 and the other end to the throttle element 4. The motion element 6 is made from a high temperature resistant material with a high coefficient of thermal expansion; it may be a wire of a ceramics or metal material. It is essential that the motion element 6 expands when the temperature increases and restores itself accordingly upon temperature decrease so that the throttle element 4 covers the shutter opening 3 more or less, corresponding to the temperature of the fluid flow.

It is also possible to use the motion element 6 not as a pushing and pulling element but only as a pulling element if the throttle element 4 is biased by a spring element, for example. Further, it is possible to use the motion element 6 only as a pushing element if the throttle element 4 is biased in the opposite direction.

Should the motion element transfer pressure, it extends within a guide channel 7. This prevents the motion element 6 from evading to the sides and allows for a uniform movement of the throttle element 4.

The sensitivity and the stroke of the throttle element movement are set through the material or the length of the motion element 6. With a greater length of the motion element 6, the same is guided substantially circularly about the shutter opening 3 in the guide channel 7, the last section 7a of the guide channel 7 before the throttle element 4 being straight so as to obtain a uniform movement of the motion element 6 and, thus, of the throttle element 4.

When the receiver E of the solar-thermal power plant is in normal operation, i.e. at approximately average incident solar radiation, the throttle element 4 approximately takes the position 4a illustrated in broken lines. With an increase in the incident solar radiation, the temperature of the fluid F increases, whereby the temperature of the motion element 6 in thermal contact with the Fluid F increases as well. The motion element 6 may either be in direct contact with the fluid F, in which case the guide channel 7 is open, or it may extend within the shutter body 2. In this case, the shutter body 2 is heated by the fluid F first, before the motion element 6 is also heated up.

Heating causes an expansion of the motion element 6 resulting in a movement of the throttle element 4, whereby the free opening area of the shutter opening 3 is increased. As a result, the fluid throughput is increased. Thereby, the fluid F stays for a shorter time in the absorber zone of the receiver E heating the fluid F so that the temperature of the fluid F is decreased. With the fluid temperature decreasing, the motion element 6 contracts so that the throttle element 4 reduces the opening section of the shutter opening 3. Using the self-regulating shutter 1, the temperature of the fluid F may be kept in a predeterminable range of temperatures.

Figure 4:
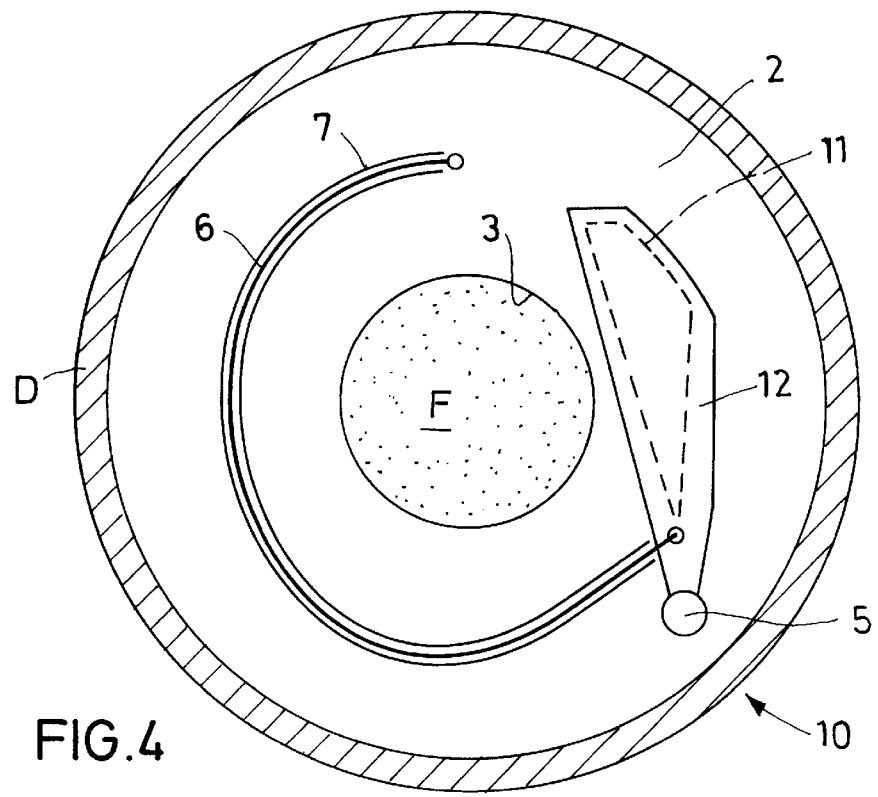
FIG. 4 illustrates a second embodiment of the shutter with an additional shutter opening.

FIG. 4 illustrates a second embodiment of a shutter 10 inserted into an absorber pipe D through which fluid F flows. The structure is substantially the same as that of the first embodiment of FIG. 1. A disc-shaped shutter body 2 also has a central shutter opening 3, a throttle element 12 fastened to a hinge 5, and a motion element 6 in a guide channel 7.

However, the throttle element 12 does not cover the central shutter opening 3 that always remains fully open, but closes an additional side opening 11 disposed farther outward. When exceeding a particular critical temperature of the fluid F, the motion element 6 expands and thereby moves the throttle element 12 outward so that the side opening 11 is cleared. This second embodiment acts as a kind of protection against overheating that increases the mass flow when the fluid F reaches a critical temperature, whereby the temperature is decreased.

In operation of the receiver E according to FIG. 2, the self-regulating shutters 1 function as described above. Supposing the mean temperature of the combined fluid F is to be 700° C., where the temperature of the fluid heated in the absorber A is 400° C., the temperature of the fluid heated in the absorber B is 600° C. and the temperature of the fluid heated in the absorber C is 800° C., the shutter 1 in the absorber pipe D of the absorber C will then be designed such that it takes its normal position at a temperature of 800° C. Should the temperature in the absorber C increase due to the characteristics of the impinging radiation, the mass flow through the absorber C has to be increased in order to lower the temperature to the operating point of 800° C. The increasing fluid temperature warms up the motion element 6 which expands so that the throttle element 4 is moved and the cross-sectional area of the shutter opening 3 is enlarged. This causes an increase in the mass flow and, thereby, the desired decrease in the temperature of the absorber C.

Since each absorber pipe D has a shutter 1, each absorber may be regulated individually so that when one absorber overheats, it is not necessary to increase the mass flow of all absorbers, which would result in one absorber having a correct temperature and the other absorbers having lowered temperatures.

It is claimed:

1. A shutter for regulating the fluid flow in an absorber pipe (D) of a solar-thermal power plant comprising at least one shutter opening (3; 11) formed in a shutter body (2), said shutter body (2) being disposed in a plane substantially normal to the direction of fluid flow in the absorber pipe (D), a movable throttle element (4; 12) for at least partly closing the shutter opening (3; 11), the throttle element (4; 12) being connected to a motion element (6) in thermal contact with fluid (F) which changes it shape as a function of fluid temperature and thereby correspondingly move said throttle element (4; 12), and said throttle element (4; 12) and said motion element (6) being movable in a plane substantially parallel to said shutter body plane.

2. The shutter as defined in claim 1 wherein said motion element (6) is an expandable wire which will expand upon an increase in fluid temperature whereby the throttle element (4; 12) is correspondingly moved to control fluid flow.

3. The shutter as defined in claim 2 wherein said wire extends within a guide channel (7) for effecting directional guided expansion of said wire.

4. The shutter as defined in claim 1 wherein said shutter body (2) has a side opening (11) adjacent said at least one shutter opening (3) and said side opening (11) is selectively closed by said throttle element (12).

5. A solar receiver comprising a plurality of absorber pipes (D) each including an absorber (A, B, C), a shutter (1; 10) in each absorber pipe (D) to effect regulated fluid flow therethrough, each shutter (1; 10) being associated with a shutter opening (3; 11) formed in a shutter body (2), each shutter body (2) being disposed in a plane substantially normal to the direction of fluid flow through its associated shutter opening (3; 11), a movable throttle element (4; 12) for at least partly closing its shutter opening (3; 11), each throttle element (4; 12) being connected to a motion element (6) in thermal contact with the fluid (F) which changes its shape as a function of fluid temperature and thereby correspondingly move its throttle element (4; 12), and each throttle element (4; 12) and its associated motion element (6) being movable in a plane substantially parallel to its associated shutter body plane.

6. The solar receiver as defined in claim 5 wherein each motion element (6) is an expandable wire which expands upon an increase in fluid temperature whereby the associated throttle element (4; 12) is correspondingly moved for effecting fluid flow control.

7. The shutter as defined in claim 6 wherein each expandable wire extends within a guide channel (7) for effecting directional guided expansion thereof.

8. The shutter as defined in claim 5 wherein each shutter body (2) has a side opening (11) adjacent its associated at least one shutter opening (3), and each side opening (11) is selectively closed by its associated throttle element (12).

* * * * *